Dec. 2, 1969  H. FLECKENSTEIN  3,482,125
ADHESIVE SOAKED ABSORBENT LAYER FOR CENTERING AND
JOINING COMPONENTS TOGETHER
Filed April 28, 1964

Inventor:
Hans Fleckenstein
By: Spencer & Kaye
Attorneys

United States Patent Office 3,482,125
Patented Dec. 2, 1969

3,482,125
ADHESIVE SOAKED ABSORBENT LAYER FOR CENTERING AND JOINING COMPONENTS TOGETHER
Hans Fleckenstein, Oldenburg, Germany, assignor to Licentia Patent-Verwaltungs-G.m.b.H., Frankfurt am Main, Germany
Filed Apr. 28, 1964, Ser. No. 363,146
Claims priority, application Germany, Apr. 29, 1963,
L 44,775
Int. Cl. H02k 15/00, 1/02, 5/16
U.S. Cl. 310—42         13 Claims

ABSTRACT OF THE DISCLOSURE

An absorbent material which is soaked with a hardenable plastic adhesive is interposed between two components which are to be joined together in centered relation to each other. The absorbent material is resilient and compressible and therefore provides a preliminary firm support which holds the components in their centered relation while the adhesive hardens.

---

Figure 1:
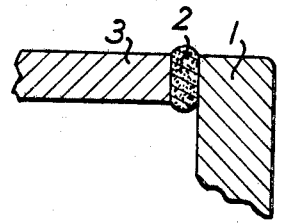

The present invention relates to the centering of rotating bodies with respect to stationary components by means of an intermediate layer which provides a fine fit, particularly to the centering of the rotors of small electrical machines with respect to the stators, as well as to a method of centering and assembling components, and to articles suitable for use in carrying out the same.

It is known to center a rotating body with respect to a stationary component, e.g., to center a rotor, with respect to the stator, by assembling the bearing supports and the stationary component, which are axially approximately adjacent to each other, directly without providing any fine fit, sometimes even omitting any rough machining, and to provide the fine fit by casting a metallic or thermoplastic material or resin, for example, by means of an injection molding or die casting process, or by pressing such a layer in place. This type of centering saves time-consuming working of the bearing supports and the stators of electrical machinery, thereby to facilitate the mass production thereof. The rotor, together with its mounting elements, e.g., brackets or plates, is introduced into a mold where it is held in centered position, the mounting brackets or plates being spaced close to the support plates carrying surfaces of the stator. The interspace is then filled out by the intermediate layer.

The casting, pressing or extruding process by which the intermediate layer is made requires the use of molds which can be closed very tightly. The sealing of the mold entails the use of difficult to manufacture forms, which themselves are awkward to attach to the mold.

It is, therefore, the object of the present invention to overcome the above drawbacks, and, with this object in view, the present invention resides in the provision of a compressible but absorbent intermediate layer in bandshaped, cord-shaped or wire-shaped form, which intermediate layer is soaked with a hardenable plastic adhesive. Such an intermediate layer may be constituted by a porous foam-like material, which in its initial state, i.e., before it is applied to the prospective juncture, is a felt band, a cord, or an absorbent cable, i.e., a yieldable elongated element which is readily flexible and which is able to seat well and fit onto a surface to which it is applied. Such an intermediate layer can thus readily be applied to a support surface. While the elongated element is applied, it retains the liquid hardenable plastic material by capillary action. After the element has been applied to the surface, the adhesive hardens or sets and firmly and intimately holds together the parts which it joins, so that an excellent fine fit is obtained.

Additional objects and advantages of the present invention will become apparent upon consideration of the following description when taken in conjunction with the accompanying drawings in which:

FIGURES 1 through 4 are fragmentary sectional views showing four embodiments of the present invention. FIGURE 5 is a sectional view showing a rotor which has been centered through the use of an intermediate layer according to the present invention. FIGURE 5 illustrates a small electrical machine with a rotor 20, a stator 21, the stationary component 22 and the bearing supports 23 which are axially adjacent to each other.

Referring now to the drawing, FIGURE 1 thereof shows a mounting bracket 1 which is connected, via the intermediate layer 2, with the wall 3 of a motor housing.

Figure 2:
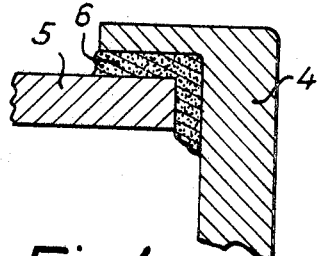

FIGURE 2 shows the mounting bracket 4 and housing wall 5 being joined by a layer 6 which forms an angle.

Figure 3:
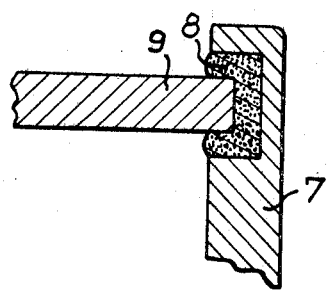

FIGURE 3 shows the mounting bracket 7 as being provided with a groove within which is arranged a channel-shaped intermediate layer 8 into whose interior projects the wall 9.

Figure 4:
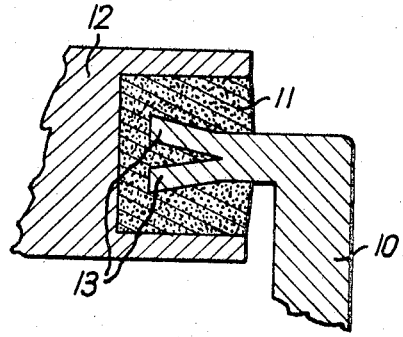
Figure 5:
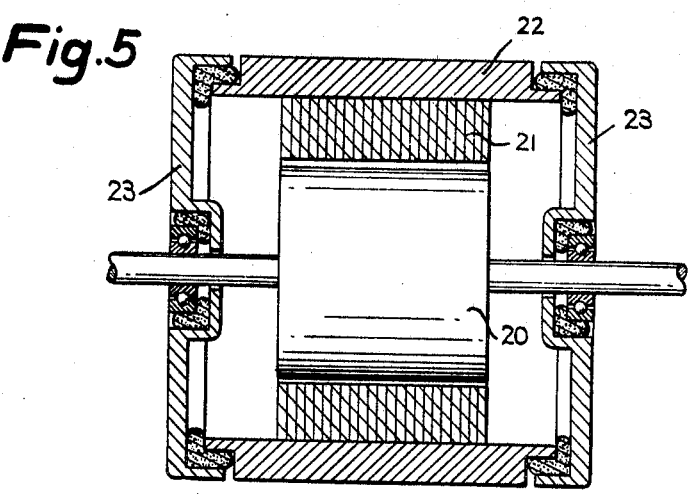

FIGURE 4 shows a mounting bracket 10 having a swallow-tail end whose spread apart projections 13 are embedded in the layer 11 which itself is arranged in a groove of the wall 12.

In all of the above-described embodiments, the intermediate layer is constituted by an absorbent carrier element which is soaked with a hardenable plastic, the material which ultimately constitutes the intermediate layer being, prior to being placed to constitute the layer, in the form of an elongated flexible element which itself is band-shaped, or rope-shaped or wire-shaped.

It will be appreciated that, thanks to the present invention, it is possible to dispense with special seals for the molds, nor does the manufacture of the motor require the placing of these seals in the mold. This means that a fine fit can be easily and quickly established. Moreover, the hardenable plastic with which the carrier is soaked will be sufficiently hard already at a time when the carrier is put in place so that the carrier can, for all practical purposes, hold the parts in place. If necessary, the carrier will be compressed somewhat as the rotor is centered. In that case, some of the plastic material may be squeezed out of the carrier, and remains attached to the mounting bracket. For all intents and purposes, however, none of the plastic is lost, so that the space needed for the fine fit is fully used.

The liquid with which the carrier is soaked can be any suitable hardenable plastic, such as solvent-free adhesives on an epoxy resin base, the setting agent being a catalyst having a borofluoride amine complex base, or an aromatic amine base, particularly an aniline base. The adhesive itself may contain a filler, as for example talcum in quantities of 30 to 50% by weight with respect to the filler containing reactive mixture.

It will be seen from the above that, thanks to the present invention, two parts, especially a rotor having a mounting bracket and a machine housing having a bearing for the rotor, can be centered with respect to each other by applying to the prospective juncture of the parts, namely, the bracket and the housing, an intermediate layer made of absorbent material and containing the hardenable plastic, after which the parts are joined together. Consequently, after the bracket and housing have been joined, the same are adjusted relative to each other, prior to final hardening of the plastic, to center the rotor with respect to the bearing.

There now follows a number of examples of elements, in their initial state, suitable for being applied to form, in the centered structure, the intermediate layers of the type described above.

EXAMPLE I

Carrier

A strip of absorbent felt having a rectangular cross section, approximately 2 mm. by 2 mm.

Plastic

Epoxy resin: 20 parts by weight; hexaterephthalic acid anhydride (setting agent H): 21 parts by weight.

EXAMPLE II

Carrier

A strip of absorbent felt having a rectangular cross section, approximately 3 mm. by 3 mm.

Plastic

Epoxy resin: 100 parts by weight; polyamine setting agent: 30 parts by weight.

EXAMPLE III

Carrier

A strip of absorbent felt having a rectangular cross section, approximately 3 mm. by 3 mm.

Plastic

Epoxy resin: 180 parts by weight; setting agents H as Example 1: 126 parts by weight.

EXAMPLE IV

Carrier

As Example I or II or III.

Plastic

Epoxy resin: 180 parts by weight; setting agents H: 126 parts by weight and 584 parts by weight (arenaceous quartz); 3 parts by weight catalyst (Desmorapid Bayer).

EXAMPLE V

Carrier

A strip of absorbent felt having a rectangular cross section, approximately 3 mm. by 3 mm.

Plastic

Epoxy resin: 100 parts by weight; hexaterephthalic acid anhydride 70 parts by weight; catalyst: 1.7 parts by weight (Desmorapid Bayer).

EXAMPLE VI

Carrier

A strip of absorbent felt having a rectangular cross section, approximately 3 mm. by 3 mm.

Plastic

Epoxy resin based on bisphenol A with epoxide equivalent of approximately 200: 100 parts by weight; lauryl-glycidyl ether: 10 parts by weight; boron fluoride aniline complex in butane diolglycidyl ether: 10 parts by weight.

It will be understood that the above description of the present invention is susceptible to various modifications, changes and adaptations.

What is claimed is:

1. In combination: two components which components are to be centered with respect to each other and an intermediate layer interposed between said components for joining the same, one of said components being provided with a groove within which said intermediate layer is arranged, the other of said components being provided with spread apart projections, said projections being embedded in said intermediate layer, said intermediate layer being made of an absorbent carrier which is soaked with a hardenable plastic adhesive, in consequence of which said components are centered relative to each other after they have been joined together by said intermediate layer but before said adhesive has fully hardened.

2. In combination: two components one of said components being a mounting member carrying a rotor and the other of said components being a machine housing carrying a bearing for said rotor, which components are to be centered with respect to each other and an intermediate layer interposed between said components for joining the same, said intermediate layer being made of an absorbent carrier which is soaked with a hardenable plastic adhesive, in consequence of which said components are centered relative to each other after they have been joined together by said intermediate layer but before said adhesive has fully hardened, one of said components being provided with a groove within which said intermediate layer is arranged, said intermediate layer having a channel-shaped configuration in whose interior the other of said components is received.

3. The combination defined in claim 2 wherein said layer, prior to having been placed between said components, was in the form of an elongated flexible band-shaped, cord-shaped, or wire-shaped element.

4. The combination defined in claim 2 wherein said intermediate layer is angle-shaped, one side of the angle being radically imposed between the housing wall and a part of the mounting spaced radically outwardly of, and surrounding the housing.

5. The combination defined in claim 4 wherein another side of said angle is arranged between portions of the said housing and mounting which are axially spaced from each other, and in which there are a plurality of axially spaced angular members at spaced portions of said housing.

6. The combination defined in claim 2 wherein said adhesive is solvent free and has an epoxy resin base and incorporates a catalytically acting hardener.

7. The combination defined in claim 6 wherein said hardener is a borofluoride amine complex on an aromatic amine base.

8. The combination defined in claim 6 wherein said adhesive incorporates 30 to 50% of talcum by weight as a filler.

9. In combination: two components one of said components being a mounting member carrying a rotor and the other of said components being a machine housing carrying a bearing for said rotor, which are to be centered with respect to each other and an intermediate layer interposed between said components for joining the same, said intermediate layer being made of an absorbent carrier which is soaked with a hardenable plastic adhesive, in consequence of which said components are centered relative to each other after they have been joined together by said intermediate layer but before said adhesive has fully hardened, one of said components is provided with a groove within which said intermediate layer is arranged, the other of said components being provided with spread apart projections, said projections being embedded in said intermediate layer.

10. The combination defined in claim 9 wherein said layer, prior to having been placed between said components, was in the form of an elongated flexible band-shaped, cord-shaped, or wire-shaped element.

11. The combination defined in claim 9 wherein said adhesive incorporates 30 to 50% of talcum by weight as a filler.

12. The combination defined in claim 9 wherein said adhesive is solvent free and has an epoxy resin base and incorporates a catalytically acting hardener.

13. The combination defined in claim 12 wherein said hardener is a borofluoride amine complex on an aromatic amine base.

References Cited
UNITED STATES PATENTS

| | | | |
|---|---|---|---|
| 2,106,385 | 1/1938 | Springer | 161—96 XR |
| 2,912,398 | 11/1959 | Johnson et al. | 156—330 XR |
| 2,924,264 | 2/1960 | Imhof | 161—189 XR |
| 3,018,541 | 1/1962 | Hunt et al. | 156—294 XR |
| 3,176,172 | 3/1965 | Thompson et al. | 310—43 XR |

ROBERT F. BURNETT, Primary Examiner

WILLIAM A. POWELL, Assistant Examiner

U.S. Cl. X.R.

156—293, 313, 330; 161—44, 184; 310—43, 89, 90